(12) United States Patent
Hombo

(10) Patent No.: US 7,751,593 B2
(45) Date of Patent: Jul. 6, 2010

(54) IMAGE READING APPARATUS AND METHOD OF CONTROLLING IMAGE READING APPARATUS

(75) Inventor: Tsunao Hombo, Chuo-ku (JP)

(73) Assignee: Canon Kabushiki Kaisha (JP)

( * ) Notice: Subject to any disclaimer, the term of this patent is extended or adjusted under 35 U.S.C. 154(b) by 1284 days.

(21) Appl. No.: 11/172,120

(22) Filed: Jun. 30, 2005

(65) Prior Publication Data

US 2006/0002591 A1 Jan. 5, 2006

(30) Foreign Application Priority Data

Jul. 5, 2004 (JP) ............................. 2004-198343

(51) Int. Cl.
*G06K 9/00* (2006.01)

(52) U.S. Cl. .................. 382/115; 382/124; 382/125; 382/193; 382/195; 382/209

(58) Field of Classification Search ................ 382/115, 382/116, 117, 118, 124, 125, 193, 195, 209
See application file for complete search history.

(56) References Cited

U.S. PATENT DOCUMENTS

| | | | |
|---|---|---|---|
| 5,920,640 A * | 7/1999 | Salatino et al. | 382/124 |
| 6,484,260 B1 * | 11/2002 | Scott et al. | 713/186 |
| 7,136,514 B1 * | 11/2006 | Wong | 382/124 |
| 7,466,348 B2 * | 12/2008 | Morikawa et al. | 348/231.3 |
| 2003/0012105 A1 * | 1/2003 | Miyazaki et al. | 369/53.13 |
| 2003/0095690 A1 * | 5/2003 | Su et al. | 382/124 |

FOREIGN PATENT DOCUMENTS

| | | |
|---|---|---|
| JP | 5-68168 A | 3/1993 |
| JP | 7-220075 A | 8/1995 |
| JP | 8-129634 A | 5/1996 |
| JP | 8-315143 A | 11/1996 |
| JP | 9-186312 A | 7/1997 |
| JP | 10-69324 A | 3/1998 |
| JP | 10-154231 A | 6/1998 |
| JP | 2000-215302 A | 8/2000 |
| JP | 2000276018 A | 10/2000 |
| JP | 2001063177 A | 3/2001 |
| JP | 2002-170107 A | 6/2002 |
| JP | 2003-271936 A | 9/2003 |

* cited by examiner

*Primary Examiner*—Matthew C Bella
*Assistant Examiner*—Mike Rahmjoo
(74) *Attorney, Agent, or Firm*—Rossi, Kimms & McDowell LLP

(57) ABSTRACT

An image reading apparatus having a security function that realizes highly precise authentication and high operability while suppressing an increase in manufacturing cost. An original 10 is placed on a platen glass 12, and an authentication card 80 is placed on a security information reading section 101. An image sensor 25 reads an image of the original 10 placed on the platen glass 12 and security information stored in the authentication card 80 placed on the security information reading section 101. A control section 4 controls processing of the image of the original 10 read by the image sensor 25 in accordance with the security information read by the image sensor 25.

18 Claims, 13 Drawing Sheets

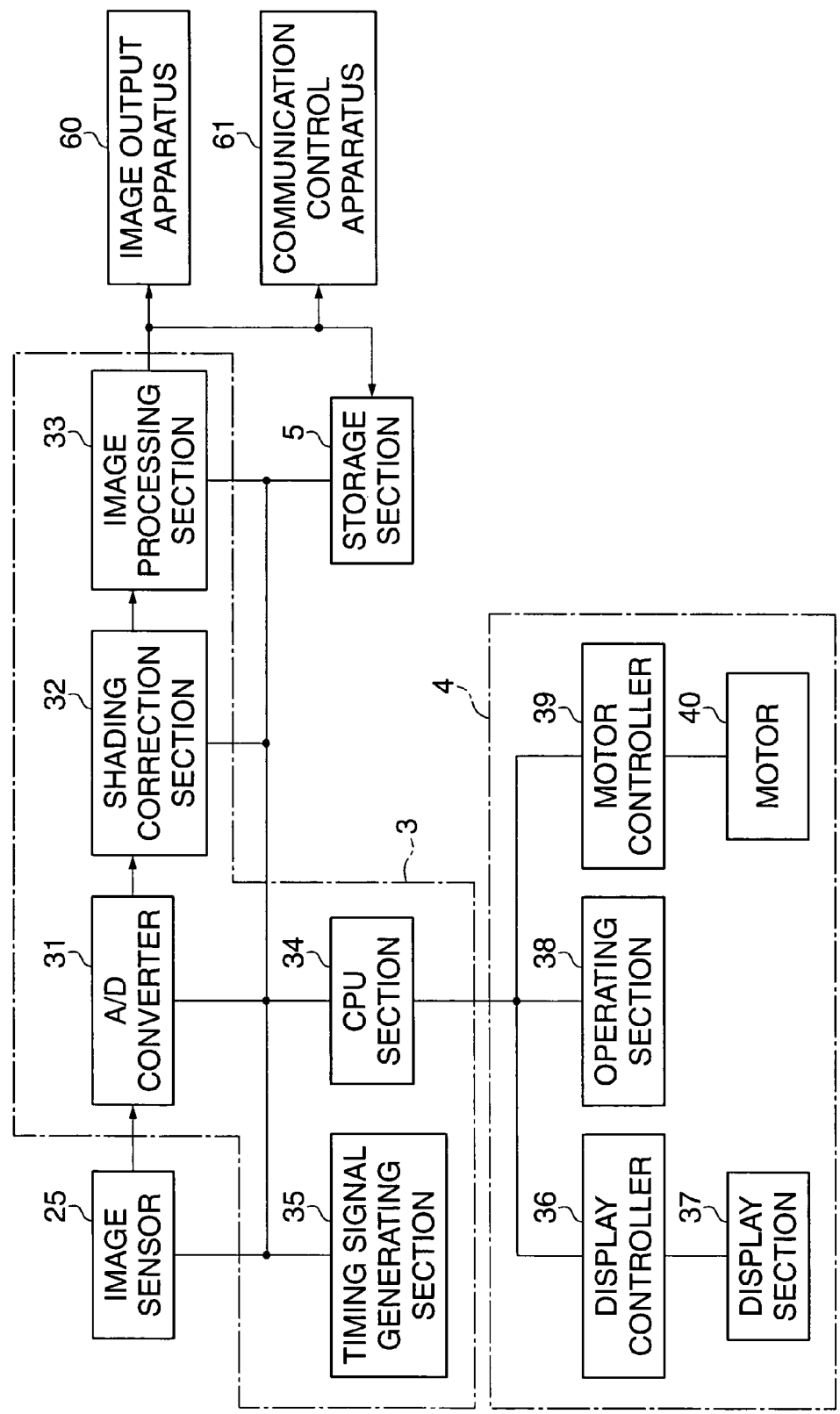

IMAGE READING APPARATUS AND METHOD OF CONTROLLING IMAGE READING APPARATUS

BACKGROUND OF THE INVENTION

1. Field of the Invention

The present invention relates to an image reading apparatus having a security function, and a method of controlling an image reading apparatus.

2. Description of the Related Art

As so-called "network society" has expanded, information processing apparatuses have become more integrated with networks, resulting in a greater need for security functions such as personal authentication. In addition to personal authentication using a key or an IC (integrated circuit) card, attention has been focused on authentication using biometric information such as fingerprints.

As examples, a reading method that uses an optical system such as a prism as a method of reading fingerprints has been disclosed in Japanese Laid-Open Patent Publication (Kokai) No. H08-315143 and technology where photodiodes are disposed adjacent to TFT (thin film transistor) elements on a liquid crystal display apparatus and an image is picked up in the same way as a CCD (charge-coupled device) has been disclosed in Japanese Laid-Open Patent Publication (Kokai) No. H09-186312. Technologies relating to methods of identifying fingerprints have also been disclosed in Japanese Laid-Open Patent Publication (Kokai) No. H07-220075 and Japanese Laid-Open Patent Publication (Kokai) No. H10-154231. A technology relating to control over the operation of an information processing apparatus based on an authentication result for fingerprints has also been disclosed in Japanese Laid-Open Patent Publication (Kokai) No. H10-069324.

However, in the field of information processing apparatuses, and in particular, in the field of image reading apparatuses, the authentication precision of the security function provided in an image reading apparatus is low. Accordingly, there have been the problems that it is not possible to confirm whether operations of the image reading apparatus have been carried out by a user with the proper authority. When a security function with high authentication precision has been provided, the operation required to carry out authentication has been complicated, resulting in poor operability. There has also been the problem of an increase in manufacturing cost when an image reading apparatus is provided with a security function with high authentication precision.

SUMMARY OF THE INVENTION

It is an object of the present invention to provide an image reading apparatus having a security function that realizes highly precise authentication and high operability while suppressing an increase in manufacturing cost.

To attain the above object, in a first aspect of the present invention, there is provided an image reading apparatus comprising a first placement section on which an original is placed, a second placement section on which a security information medium is placed, an image sensor that reads an image of the original placed on the first placement section and security information stored in the security information medium placed on the second placement section, and a controller that controls processing of the image of the original read by the image sensor in accordance with the security information read by the image sensor.

Preferably, the image reading apparatus comprises a storage device that stores security information in advance, and the controller compares the security information read by the image sensor with the security information stored in the storage device and controls the processing of the image of the original read by the image sensor in accordance with a result of the comparison.

More preferably, the controller is operable when the security information read by the image sensor matches the security information stored in the storage device, to transmit the image of the original read by the image sensor to an external apparatus.

Also preferably, the controller is operable when the security information read by the image sensor does not match the security information stored in the storage device, to delete the image of the original read by the image sensor.

Preferably, the image reading apparatus further comprises a dirt detecting device that detects dirt on the second placement section, and a display device that displays a predetermined message in accordance with a result of the detection by the dirt detecting device.

More preferably, the dirt detecting device extracts, out of an image obtained by causing the image sensor to read a surface of the second placement section, pixels of which luminance exceeds a predetermined luminance level, as dirt data.

Preferably, the security information medium is printed matter on which information that specifies a person is printed.

Preferably, the security information is personal authentication information.

More preferably, the personal authentication information is a fingerprint of a user.

Still more preferably, the second placement section is masked so that an image can be read by the image sensor in only a fingerprint detection area.

Preferably, the controller stops a reading operation by the image sensor after reading the image of the original on the first placement section and resumes the reading operation by the image sensor to read the security information stored in the security information medium on the second placement section in accordance with an instruction from a user.

Alternatively, the controller causes the image sensor to read the image of the original on the first placement section and the security information of the security information medium on the placement section in a single reading operation.

With the above arrangement according to the first aspect of the present invention, the image sensor that reads the image of the original reads the security information stored in the security information medium placed on the second placement section. As a result, there is no need to provide an extra image sensor to read the security information and hence authentication is simplified. It is therefore possible to realize highly precise authentication and high operability while suppressing an increase in manufacturing cost.

To attain the above object, in a second aspect of the present invention, there is provided an image reading apparatus comprising a placement section on which an original and a security information medium are placed, an image sensor that reads an image of the original and security information stored in the security information medium that are placed on the placement section, and a controller that controls processing of the image of the original read by the image sensor in accordance with the security information read by the image sensor.

Preferably, the image reading apparatus comprises a storage device that stores security information in advance, and the controller compares the security information read by the image sensor with security information stored in the storage device and controls the processing of the image of the original read by the image sensor in accordance with a result of the comparison.

More preferably, the controller is operable when the security information read by the image sensor matches the security information stored in the storage device, to transmit the image of the original read by the image sensor to an external apparatus.

Still more preferably, the controller is operable when the security information read by the image sensor does not match the security information stored in the storage device, to delete the image of the original read by the image sensor.

Preferably, the image reading apparatus further comprises a dirt detecting device that detects dirt on the placement section, and a display device that displays a predetermined message in accordance with a result of the detection by the dirt detecting device.

More preferably, the dirt detecting device extracts, out of an image obtained by causing the image sensor to read a surface of the placement section, pixels of which luminance exceeds a predetermined luminance level as dirt data.

Preferably, the controller stops a reading operation by the image sensor after reading the image of the original on the placement section and resumes the reading operation by the image sensor to read the security information stored in the security information medium on the placement section in accordance with an instruction from a user.

With the above arrangement according to the second aspect of the present invention, the image sensor that reads the image of the original reads the security information stored in the security information medium placed on the placement section. As a result, there is no need to provide an extra image sensor and an extra placement section to read the security information and hence authentication is simplified. It is therefore possible to realize highly precise authentication and high operability while suppressing an increase in manufacturing cost.

To attain the above object, in a third aspect of the present invention, there is provided a method of controlling an image reading apparatus comprising a first reading step of reading an image of an original, a second reading step of reading security information stored in a security information medium, and a control step of controlling processing of the image of the original read in the first reading step in accordance with the security information read in the second reading step, and the image of the original is read in the first reading step and the security information is read in the second reading step using the same image sensor.

The above and other objects, features, and advantages of the invention will become more apparent from the following detailed description taken in conjunction with the accompanying drawings.

BRIEF DESCRIPTION OF THE DRAWINGS

FIG. 3 is a block diagram useful in explaining a signal processing section and a control section of the image reading apparatus;

DETAILED DESCRIPTION OF THE PREFERRED EMBODIMENTS

The present invention will now be described in detail below with reference to the drawings showing preferred embodiments thereof.

First, a first embodiment of the present invention will be described.

Figure 1:
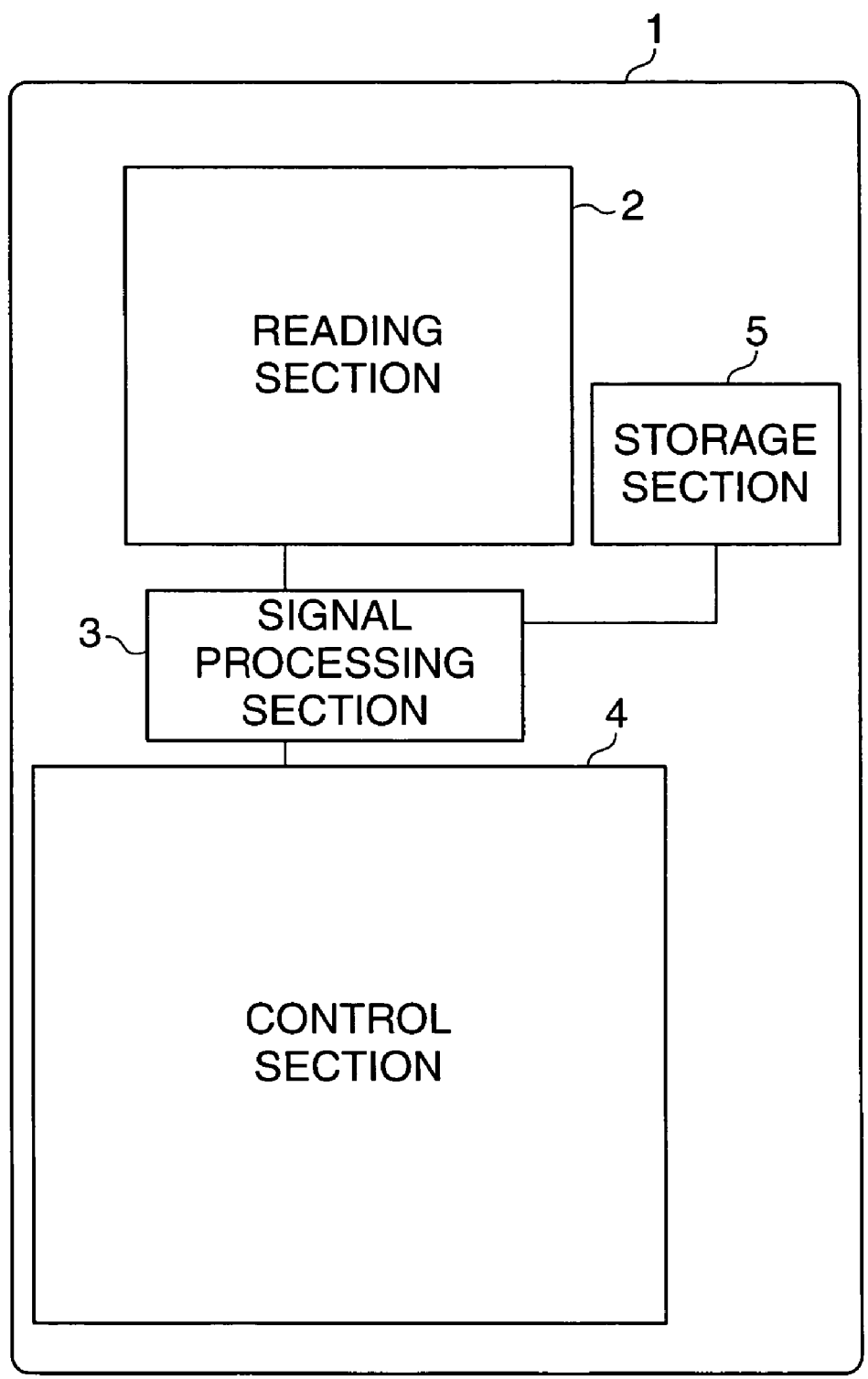
FIG. 1 is a schematic diagram showing the construction of an image reading apparatus according to a first embodiment of the present invention.

FIG. 1 is a schematic diagram showing the construction of an image reading apparatus according to the first embodiment of the present invention.

As shown in FIG. 1, the image reading apparatus 1 is comprised of a reading section 2 that optically reads an image of an original and converts the read image to image data, a signal processing section 3 that is connected to an image output apparatus 60 and a communication control apparatus 61, described later, and processes image data read by the reading section 2, a control section 4 that controls the operation of the reading section 2, and a storage section 5 that is connected to the signal processing section 3 and analyzes and stores the image data read by the reading section 2. The image output apparatus 60 and the communication control apparatus 61 constitute a facsimile/copying system together with the image reading apparatus 1.

Figure 2A:
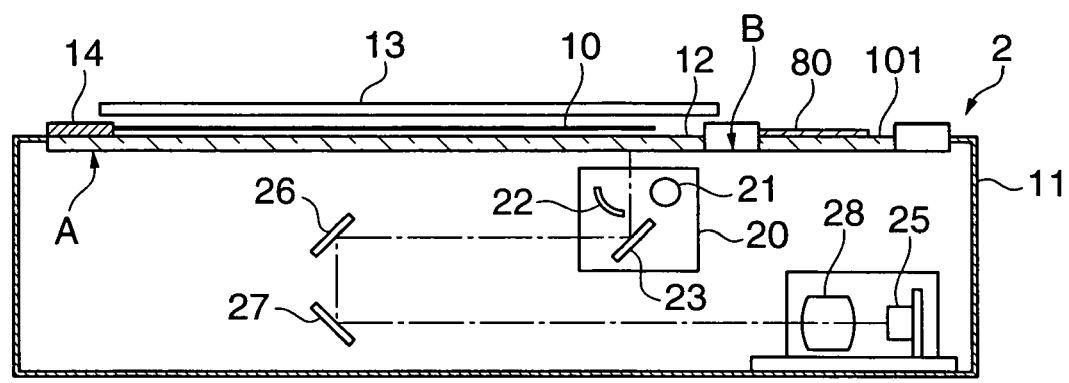
FIG. 2A is a cross-sectional view of a reading section appearing in FIG. 1.
Figure 2B:
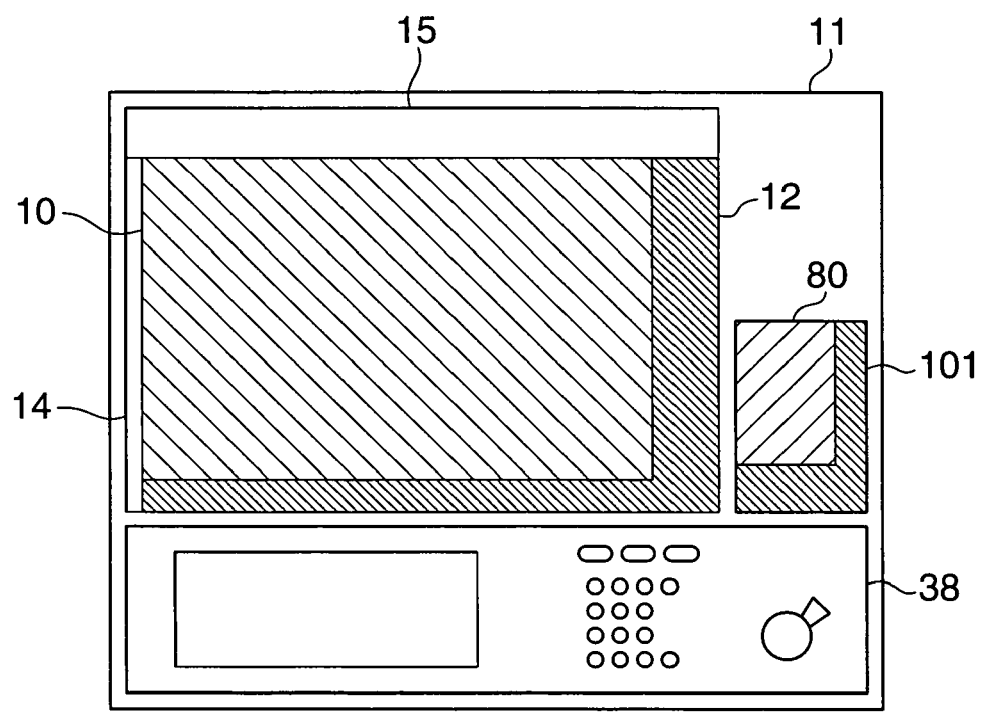
FIG. 2B is a plan view showing the reading section as viewed from above in a state where a platen cover has been removed.

FIG. 2A is a cross-sectional view of the reading section 2 appearing in FIG. 1, and FIG. 2B is a plan view showing the reading section 2 as viewed from above in a state where a platen cover has been removed.

In FIG. 2A, the reading section 2 includes a reading section main body (cover) 11, with a platen glass (placement surface) 12 on which an original 10 is placed being provided on an upper surface of the reading section main body 11. A platen cover 13 that can be opened and closed is provided on the platen glass 12. A sub-scanning registration plate 14 that extends in a main-scanning direction is provided on a sub-scanning start end of the platen glass 12. A security information reading section (i.e., another placement surface) 101 on which an authentication card (a security information medium) 80, referred to later, is placed is provided behind a sub-scanning completion end of the platen glass 12 in the sub-scanning direction. By providing the security information reading section 101, authentication with higher precision can be realized.

A carriage 20 that is movable in the sub-scanning direction is provided below the platen glass 12. A lamp 21 for producing a line of light for illuminating the original 10, a reflector 22 that irradiates the light emitted from the lamp 21 onto the original 10, and a first mirror 23 that reflects the light reflected by the original 10 are provided inside the carriage 20. A one-dimensional image sensor 25 that reads an image is provided at a base part inside the reading section main body 11, and a second mirror 26 and a third mirror 27 that guide light from the first mirror 23 to the image sensor 25 are provided inside the reading section main body 11. A lens 28 that forms an image on the image sensor 25 is provided in front of the image sensor 25 along the optical path.

The carriage 20 is moved reciprocally in the sub-scanning direction by a motor 40, described later. The second mirror 26 and the third mirror 27 are driven by a driving device, not shown, to move in the same direction as the movement of the carriage 20 at half the speed of the carriage 20 in response to the movement of the carriage 20. With this arrangement, the surface of the original 10 can be scanned without the distance between the original surface and the image sensor 25 changing.

In FIG. 2, symbol "A" designates a first reading scanning start position and symbol "B" designates a second reading scanning start position. When the image of the original 10 is read, scanning is started with the carriage 20 being positioned at the first reading scanning start position A, while when security information of the authentication card 80 is read, scanning is started with the carriage 20 being positioned at the second reading scanning start position B. Immediately after the power of the image reading apparatus 1 has been turned on or when a job has been completed, the carriage 20 is positioned at the first reading scanning start position A.

The original 10 is placed on the platen glass 12 along a main scanning registration plate 15, which is provided on the sub-scanning registration plate 14 and the platen glass 12, and the authentication card 80 is placed on the security information reading section 101 (see FIG. 2B). The image sensor 25 reads the image of the original 10 placed on the platen glass 12 and the security information of the authentication card 80 placed on the security information reading section 101. With this arrangement, it is unnecessary to provide an extra image sensor for reading the security information and hence authentication is simplified.

FIG. 3 is a block diagram useful in explaining the signal processing section 3 and the control section 4 of the image reading apparatus 1.

As shown in FIG. 3, the signal processing section 3 is comprised of an analog-to-digital converter (hereinafter referred to as "the A/D converter") 31 that converts an output signal from the image sensor 25 into digital image data, a shading correction section 32 that carries out shading correction on the image data outputted from the A/D converter 31, an image processing section 33 that carries out image processing on the image data outputted from the shading correction section 32, a CPU (central processing unit) section 34 that controls the entire image reading apparatus 1, and a timing signal generating section 35 that supplies timing signals to the image sensor 25, the A/D converter 31, the shading correction section 32, the image processing section 33, and the CPU section 34. The CPU section 34 includes a ROM (read only memory) that stores programs and the like, and a RAM (random access memory) that serves as a work area.

The storage section 5 detects and stores the security information read by the security information reading section 101.

The control section 4 of the image reading apparatus 1 is comprised of an operating section 38 for operating the image reading apparatus 1 via key inputs, a display section 37 that displays status information indicative of the status of the image reading apparatus 1 and data and the like inputted by the operating section 38, a display controller 36 that controls the display section 37, the motor 40 that drives the carriage 20 that is movable in the sub-scanning direction, and a motor controller 39 that controls the operation of the motor 40.

Image data outputted from the image processing section 33 is sent to the communication control apparatus 61 and the image output apparatus 60 that constitutes a facsimile/copying system together with the image reading apparatus 1, to thereby enable image transmission by the communication control apparatus 61 and image output by the image output apparatus 60. In addition, images received by the communication control apparatus 61 are outputted from the image output apparatus 60. The CPU section 34 is connected to the communication control apparatus 61 and the image output apparatus 60 via a bus, not shown.

Figure 4:
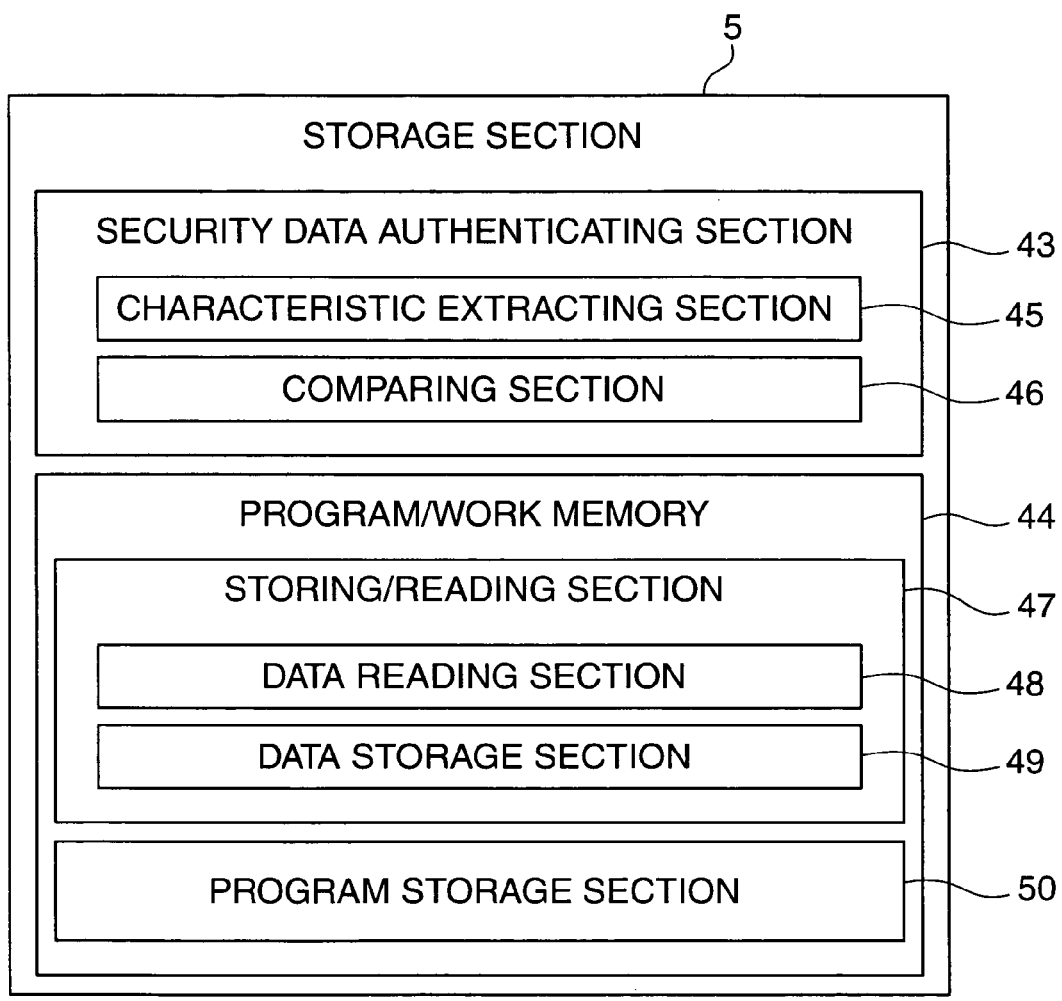
FIG. 4 is a block diagram useful in explaining the construction of a storage section appearing in FIG. 1.

FIG. 4 is a block diagram useful in explaining the construction of the storage section 5 appearing in FIG. 1.

As shown in FIG. 4, the storage section 5 is comprised of a security data authenticating section (information comparing section) 43 that compares the security information read by the image sensor 25 with security information stored in advance, and a program/work memory 44. The security data authenticating section 43 includes a characteristic extracting section 45 that extracts a characteristic of the security information, and a checking section 46 that checks the extracted characteristic. The program/work memory 44 includes a storing/reading section 47 that stores or reads security information, and a program storage section 50 that stores an application program executed to authenticate the security information. The storing/reading section 47 includes a data reading section 48 that reads user registration data, and a data storage section 49 that stores the user registration data.

Figure 5:
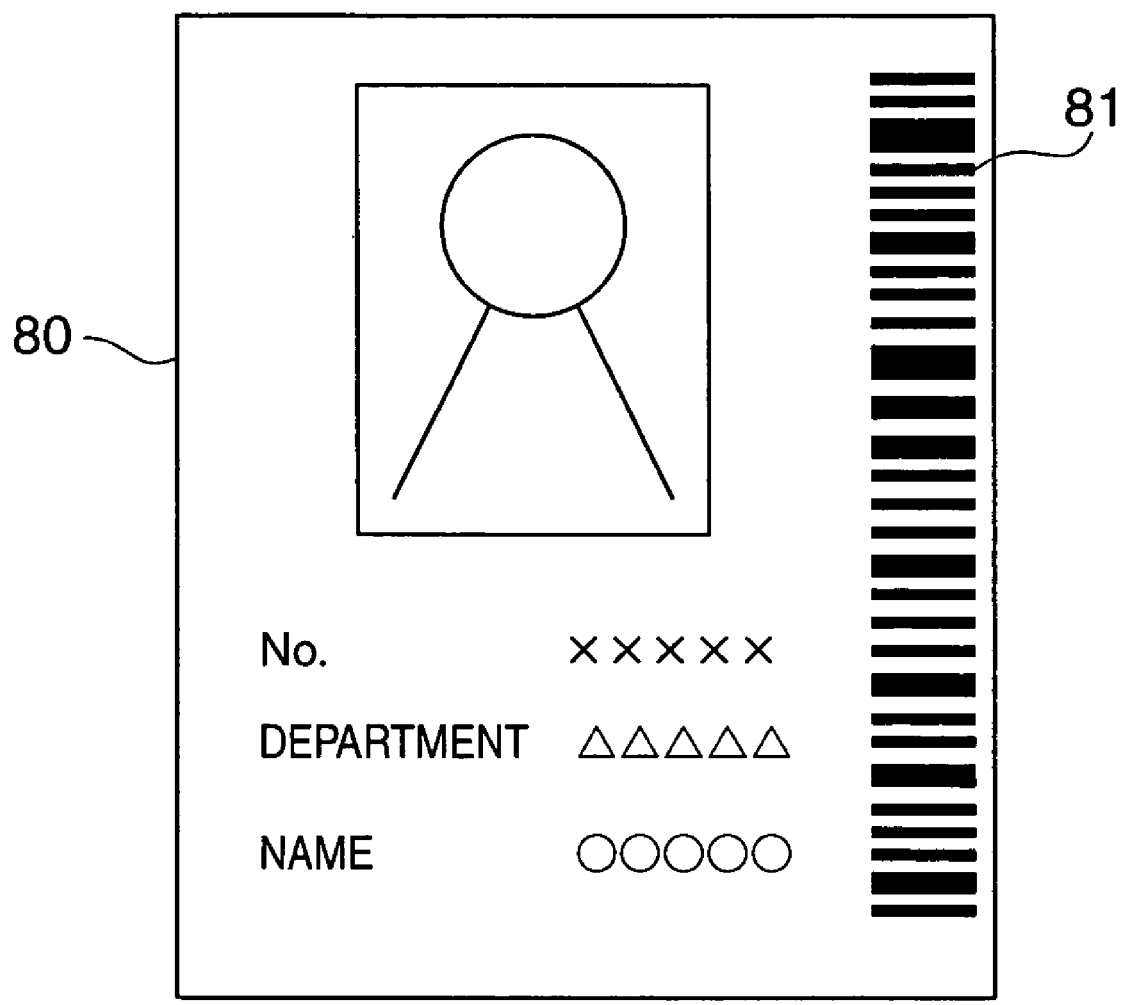
FIG. 5 is a view showing one example of an authentication card on which security information is provided.

FIG. 5 is a view showing one example of an authentication card on which security information is provided.

As shown in FIG. 5, ID information (personal authentication information) such as a facial photograph, a signature, and the like that can specify a person is printed on the authentication card 80, with a barcode 81 produced by converting the ID information using a predetermined method also being printed on the authentication card 80. By doing so, authentication with even higher precision can be realized.

Figure 6:
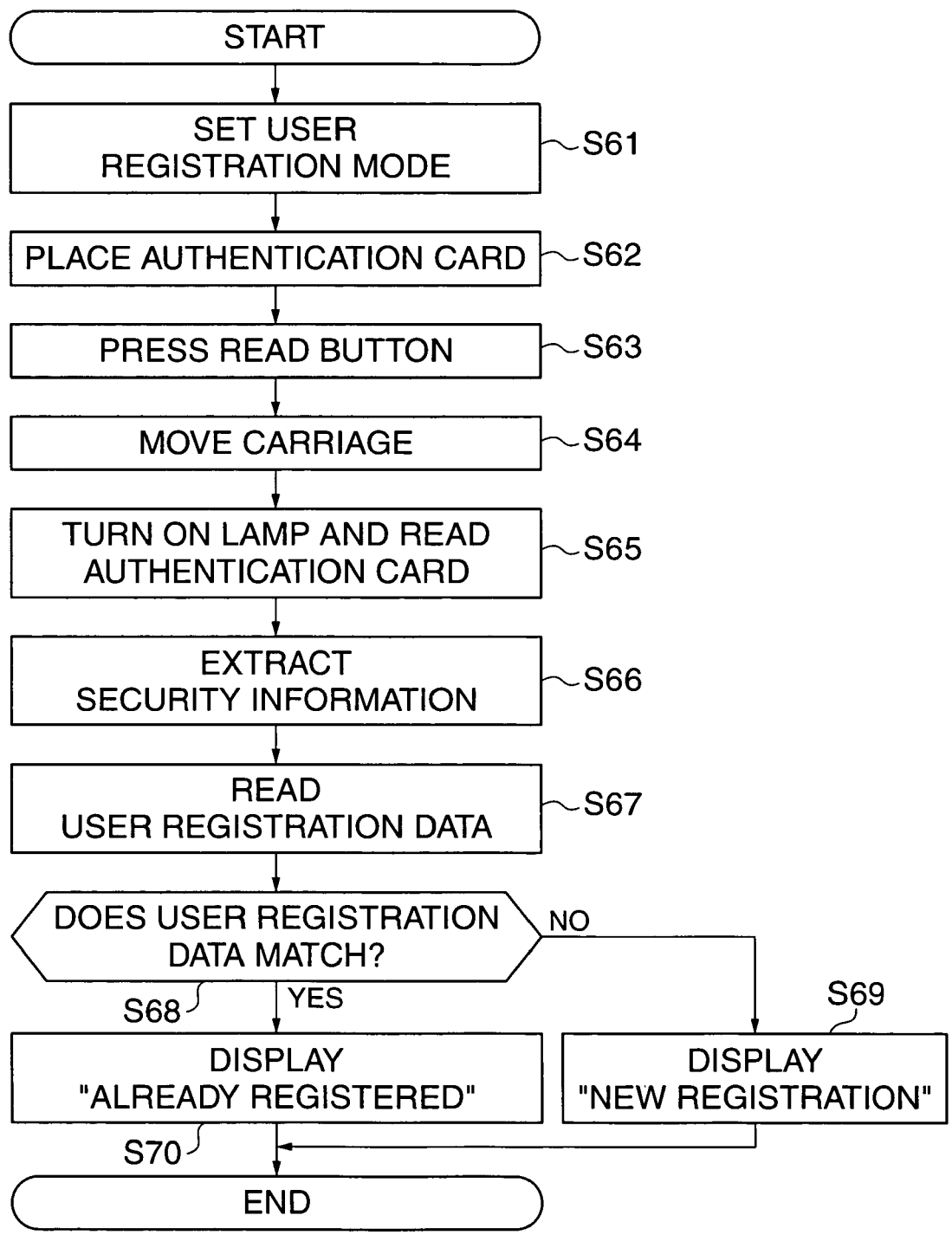
FIG. 6 is a flowchart showing the procedure of a method of registering security information using the reading section in FIG. 2A.

FIG. 6 is a flowchart showing the procedure of a method of registering security information using the reading section 2 appearing in FIG. 2A.

As shown in FIG. 6, the user operates a button or the like, not shown, provided on the operating section 38 to set user registration mode where security information can be registered by the user (step S61), and places the authentication card 80 on the security information reading section 101 (step S62).

When the user has pressed a read button, not shown, on the operating section 38 (step S63), the CPU 34 causes the carriage 20 to move to the second reading scanning start position B (step S64). After this, the CPU 34 causes the lamp 21 to be turned on and causes the carriage 20 to scan and read the authentication card 80 placed on the security information reading section 101 (step S65).

Authentication card data read in the step S65 is transmitted via the image processing section 33 to the characteristic extracting section 45 inside the storage section 5, with the characteristic extracting section 45 extracting the barcode 81 and converting the barcode 81 into user data using a predetermined means (step S66).

Next, the user registration data registered in advance inside the data storage section 49 is read by the data reading section 48 (step S67), it is determined whether data that matches the user data converted by the characteristic extracting section 45 is present in the read user registration data (step S68), and when there is no data that matches the converted user data, the user data is stored in the data storage section 49, a message "NEW REGISTRATION" is displayed on the display section 37 (step S69), and the present process is terminated.

When data that matches the user data is present ("YES" to the step S68), a message "ALREADY REGISTERED" is displayed on the display section 37 (step S70), and the present process is terminated.

Figure 7:
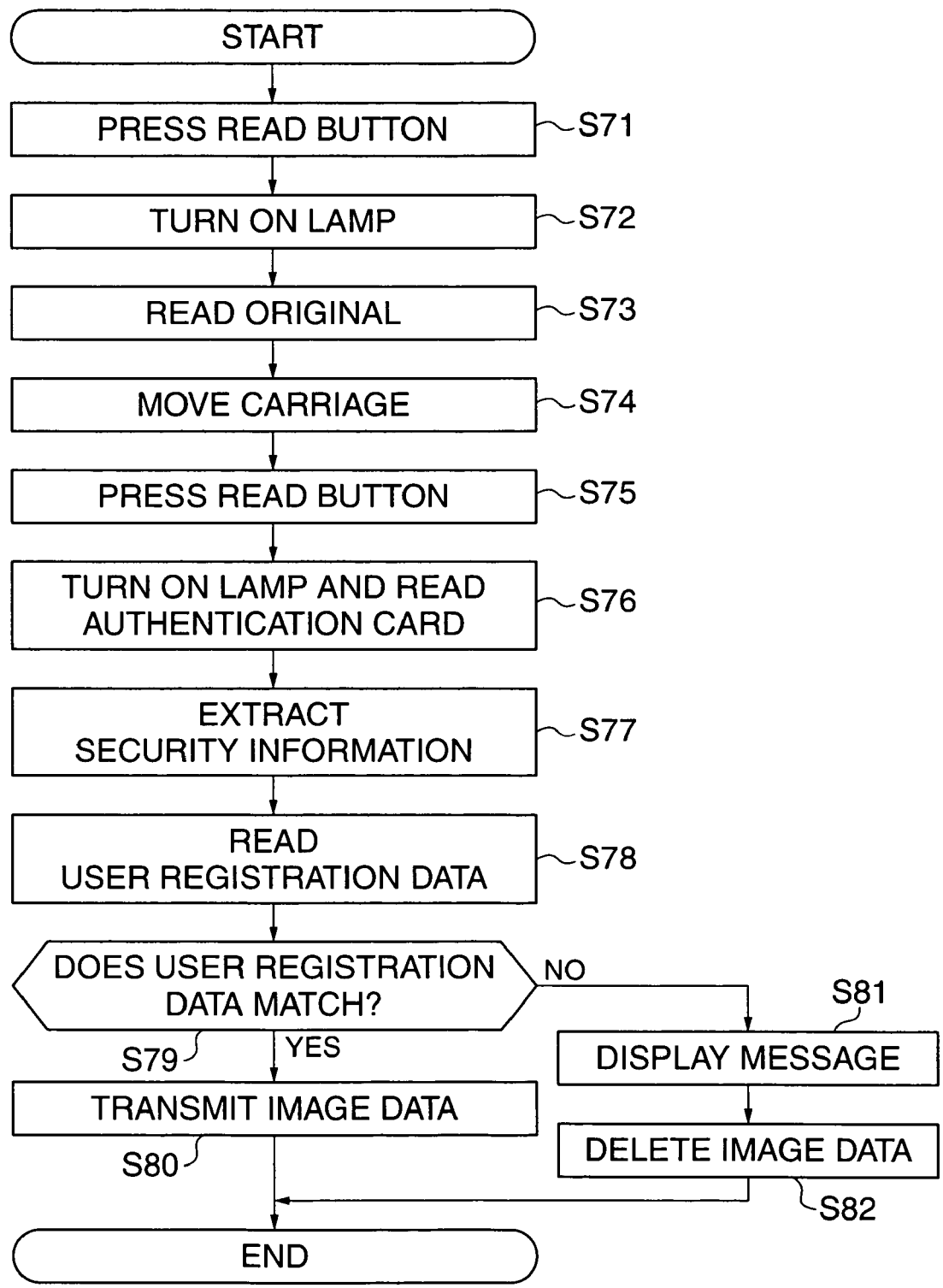
FIG. 7 is a flowchart showing the procedure of a method in which the image reading apparatus reads an image and transmits read image data to an image output apparatus.

FIG. 7 is a flowchart showing the procedure of a method in which the image reading apparatus 1 reads an image and transmits image data to the image output apparatus 60.

As shown in FIG. 7, the user places the original 10 on the platen glass 12 and presses the read button, not shown, on the operating section 38 (step S71). The CPU 34 causes the lamp 21 of the carriage 20 at the first reading scanning start position A to be turned on (step S72), a standard white board, not shown, existing at a surface portion of the platen glass 12 where the sub-scanning registration plate 14 contacts the platen glass 12 is read to generate shading data, and the image of the original 10 is read while moving the carriage 20 in the sub-scanning direction (step S73). As shown in FIG. 3, the read image data of the read original 10 is transmitted to the image processing section 33 via the image sensor 25, the A/D converter 31, and the shading correction section 32, predetermined image processing is carried out on the image data by the image processing section 33 and the resulting image data is written onto a work memory, not shown, inside the image processing section 33.

After the image of the original 10 has been read, the lamp 21 of the carriage 20 is turned off and the carriage 20 is caused to move to the second reading scanning start position B (step S74). The user places the authentication card 80 on the security information reading section 101 and presses the read button, not shown, on the operating section 38 (step S75). The lamp 21 of the carriage 20 at the second reading scanning start position B is turned on, and the ID information and the like of the authentication card 80 is read while moving in the sub-scanning direction (step S76). After the ID information of the authentication card 80 has been read, the lamp 21 of the carriage 20 is turned off and the carriage 20 is caused to move to the first reading scanning start position A. The read authentication card data is subjected to predetermined image processing by the image processing section 33 and then transmitted to the storage section 5. In addition, the barcode 81 is extracted from the transmitted authentication card data by the characteristic extracting section 45 inside the storage section 5 and converted into user data by the predetermined means (step S77).

Next, the data reading section 48 reads the user registration data registered in advance inside the data storage section 49 (step S78), and determines whether data that matches the user data converted by the characteristic extracting section 45 is present in the read user registration data (step S79), and when there is data that matches the user data, the image data stored in the work memory inside the image processing section 33 is transmitted to the image output apparatus 60, and the present process is terminated (step S80).

When there is no data that matches the user data ("NO" to step S79), it is determined that the user is not authorized to use the image reading apparatus 1, a message informing the user to that effect is displayed on the display section 37 (step S81), the image data stored in the work memory inside the image processing section 33 is deleted (step S82), and the present process is terminated.

As described above, according to the present embodiment, since the image sensor 25 reads not only the image of the original 10 but also the security information of the authentication card 80 placed on the security information reading section 101, it is unnecessary to provide an extra image sensor for reading the security information and hence authentication is simplified. It is therefore possible to realize highly precise authentication and high operability while suppressing an increase in manufacturing cost.

Also, according to the present embodiment, since the security information reading section 101 on which a security information medium is placed is provided at a separate position from the platen glass 12, it is possible to realize high precision authentication.

Although the image of the original 10 is read first and the ID information or the like of the authentication card 80 is read next in the present embodiment, it should be obvious that the same effect can be obtained when the reading order is reversed.

Also, although in the present embodiment, the carriage 20 is stopped after the image of the original on the platen glass 12 has been read, and then the carriage 20 is caused to restart moving and the security information is read in response to the read button being operated by the user, it is also possible to read the original 10 on the platen glass 12 and the security information on the security information reading section 101 in a single reading operation without stopping the carriage 20. By doing so, it is possible to reduce the reading time and hence improve the productivity of reading operations.

Figure 8:
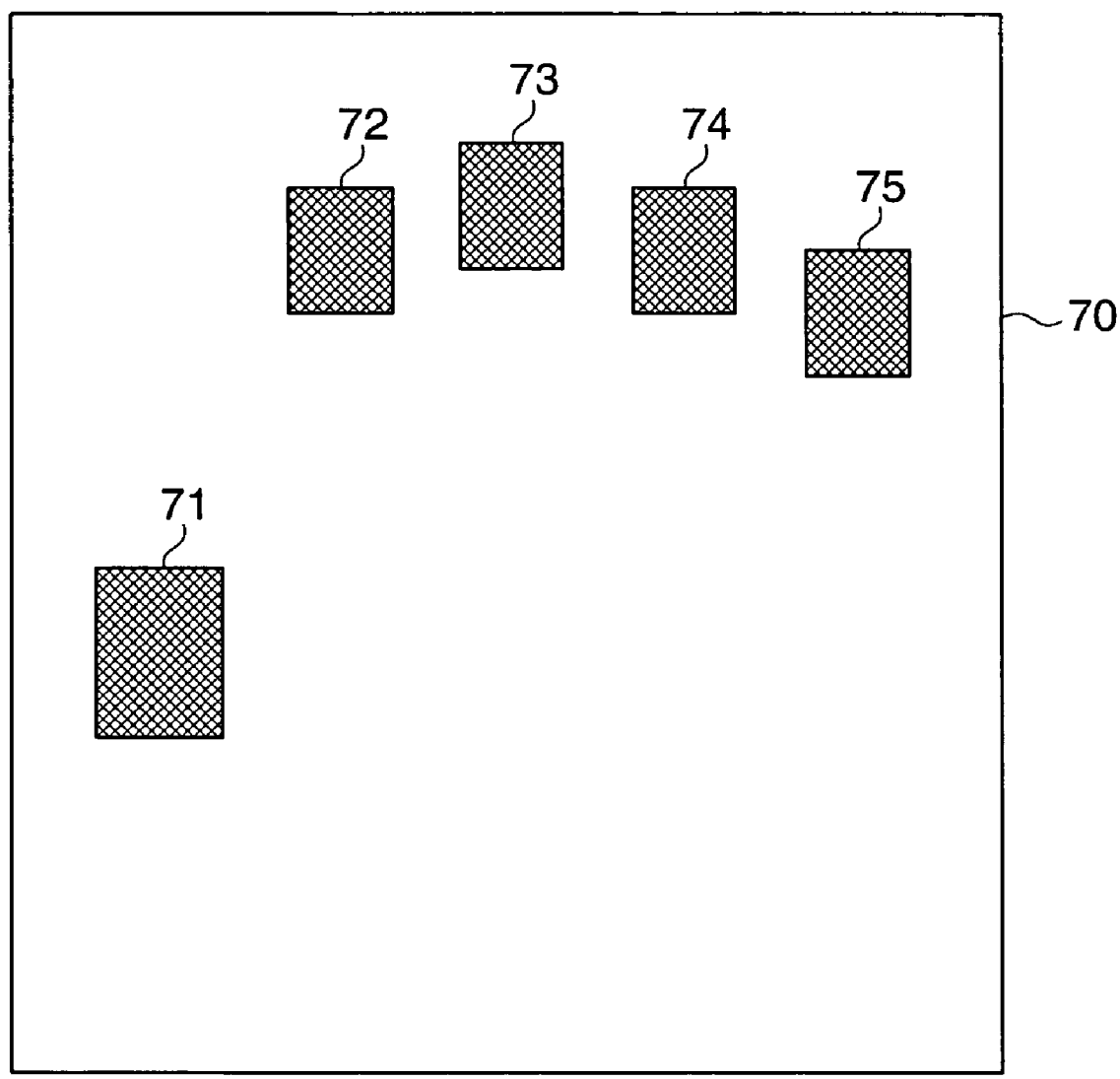
FIG. 8 is a view showing a variation of a security information reading section.

Also, although in the present embodiment, a medium on which personal information is printed, such as the authentication card 80, is used as a security information medium, the same effect can be realized by detecting one or more fingerprints that can specify individual users more precisely. In this case, the fingerprints may be read by having the user place his/her hand on the security information reading section 101, but to simplify detection of the fingerprints, as shown in FIG. 8, for example, it is possible to provide a security information reading section 70, including fingerprint detection areas 71 to 75 that read the user's fingerprints, in place of the security information reading section 101. By doing so, the authentication is simplified and even more precise authentication can be realized.

The security information reading section 70 is masked aside from the fingerprint detection areas 71 to 75 so that other images than fingerprints are not read. The user may place only a predetermined finger on the fingerprint detection area 71 with only the fingerprint of the predetermined finger being read, or all of the fingerprint detection areas 71 to 75 may be used. The registration of user data and the operation of the image reading apparatus 1 when fingerprints are used are the same as in the present embodiment described above.

Next, a second embodiment of the present invention will be described.

Figure 9:
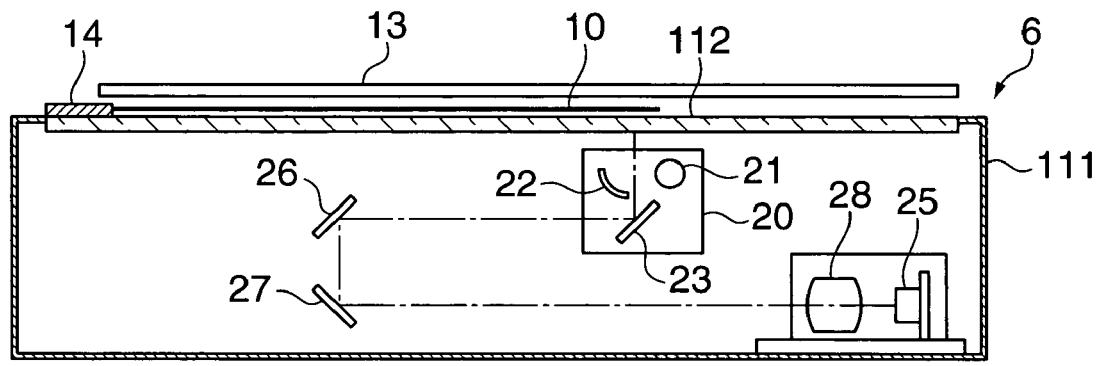
FIG. 9 is a cross-sectional view showing the construction of a reading section of an image reading apparatus according to a second embodiment of the present invention.

FIG. 9 is a cross-sectional view showing the construction of a reading section of an image reading apparatus according to the second embodiment of the present invention. Note that the construction of a reading section 6 shown in FIG. 9 is fundamentally the same as the reading section 2 in FIG. 2A, with the only difference being that the security information reading section 101 of the reading section 2 has been omitted.

Description of duplicated parts is therefore omitted and only different parts will be described.

As shown in FIG. 9, the reading section 6 includes a reading section main body (cover) 111, with a platen glass 112 on which the original 10 is placed and the authentication card 80 is placed being provided on an upper surface of the reading section main body 111. With this arrangement, it is unnecessary to provide an extra placement surface for placing the authentication card 80, so that the increase in manufacturing cost can be further suppressed.

Figure 10:
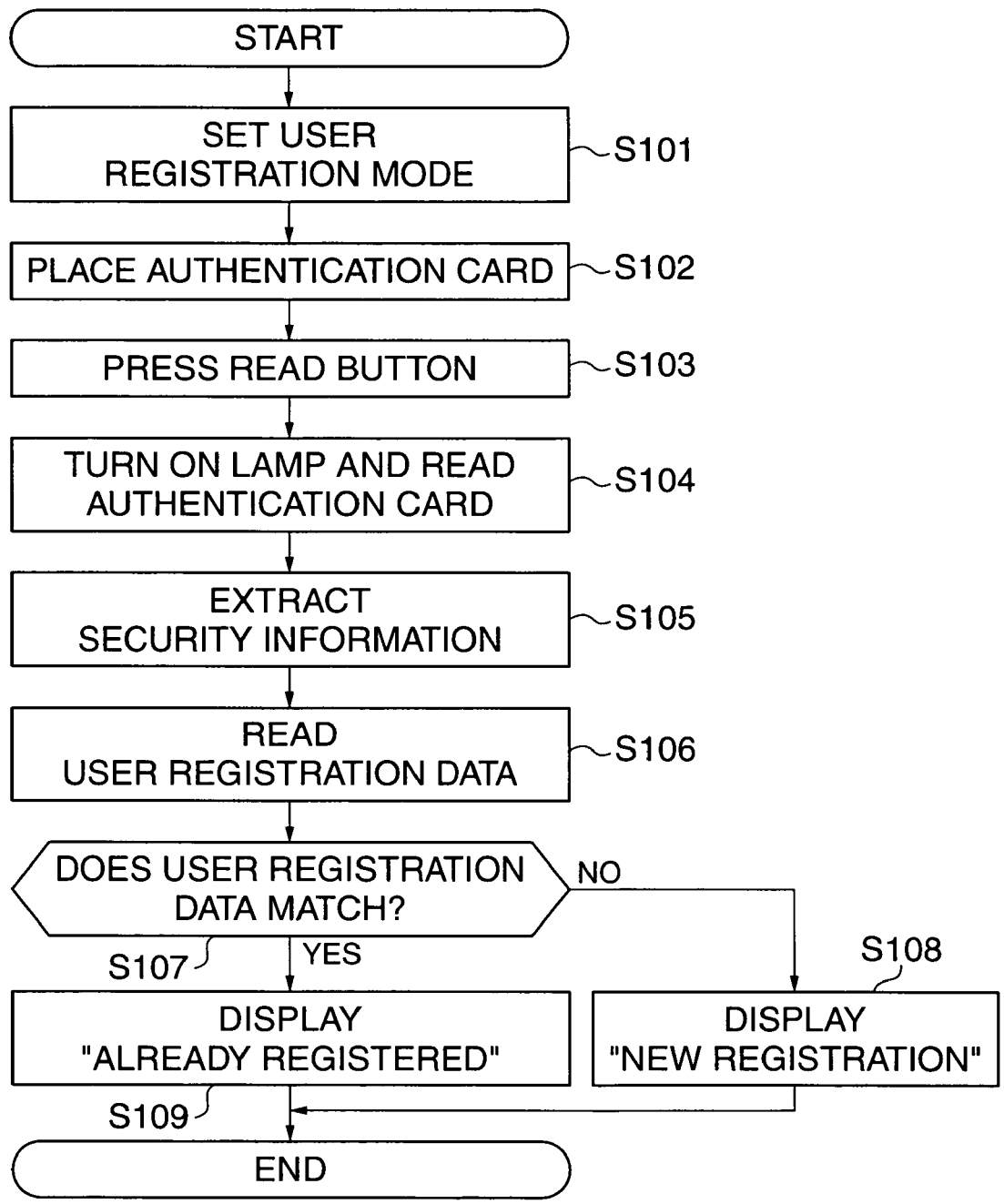
FIG. 10 is a flowchart showing the procedure of a method of registering security information using the reading section in FIG. 9.

FIG. 10 is a flowchart showing the procedure of a method of registering security information using the reading section 6 in FIG. 9.

As shown in FIG. 10, the user operates a button or the like, not shown, provided on the operating section 38 to set user registration mode where security information can be registered by the user (step S101), and places the authentication card 80 at a predetermined position on the platen glass 112 (step S102).

When the user has pressed the read button, not shown, on the operating section 38 (step S103), the lamp 21 of the carriage 20 is turned on. Also, the authentication card 80 placed on the platen glass 112 is read while the carriage 20 is moved in the sub-scanning direction (step S104).

Authentication card data read in the step S104 is transmitted via the image processing section 33 to the characteristic extracting section 45 inside the storage section 5, with the characteristic extracting section 45 extracting the barcode 81 and converting the barcode 81 into user data using a predetermined means (step S105).

Next, the user registration data registered in advance inside the data storage section 49 is read (step S106), it is determined whether data that matches the user data converted by the characteristic extracting section 45 is present in the read user registration data (step S107), and when there is no data that matches the converted user data, the user data is stored in the data storage section 49, a message "NEW REGISTRATION" is displayed on the display section 37 (step S108), and the present process is terminated.

When data that matches the user data is present, ("YES" to the step S107), a message "ALREADY REGISTERED" is displayed on the display section 37 (step S109), and the present process is terminated.

Figure 11:
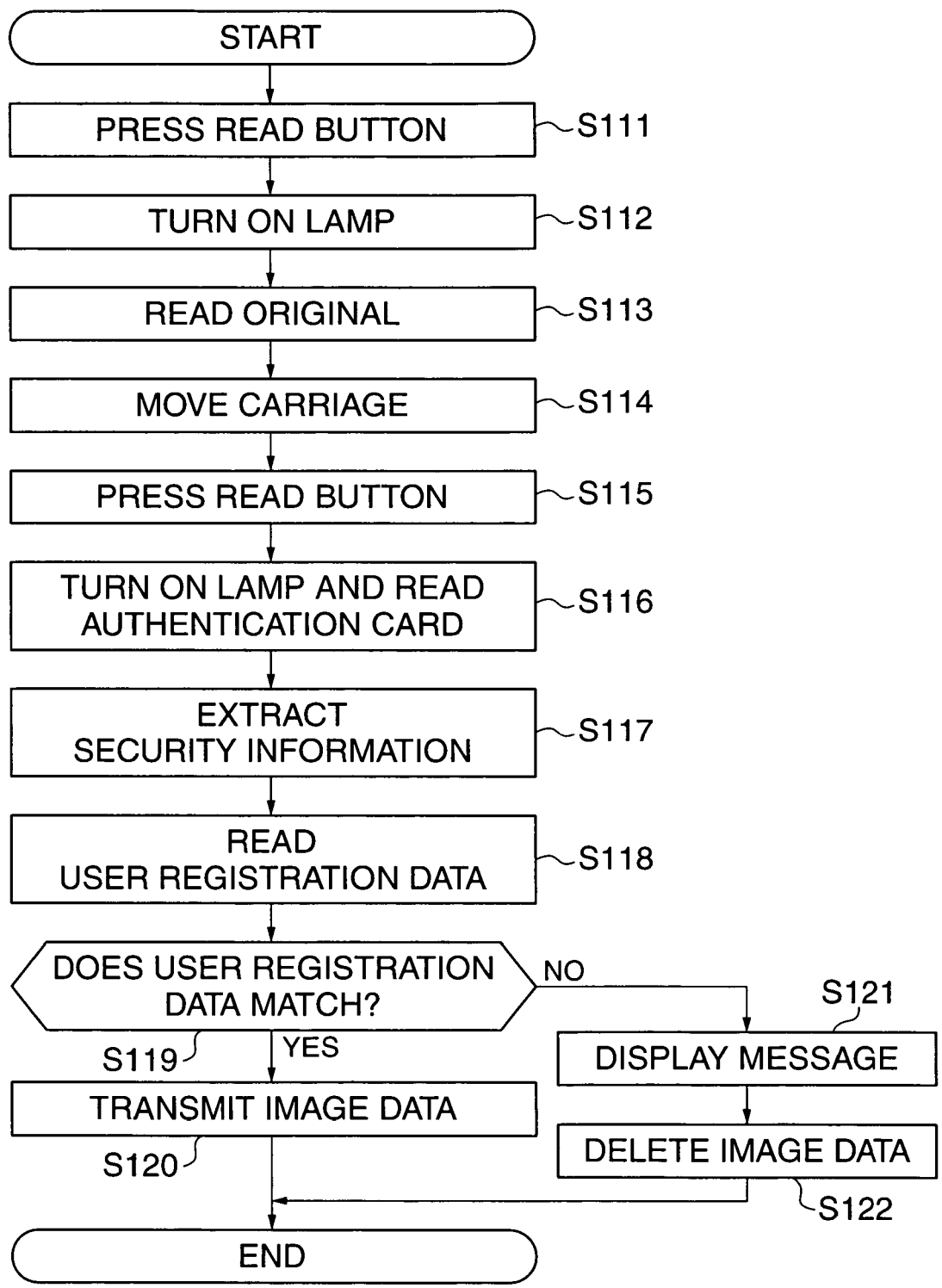
FIG. 11 is a flowchart showing the procedure of a method in which an image is read by the reading section in FIG. 9 and read image data is transmitted to an image output apparatus.

FIG. 11 is a flowchart showing the procedure of a method in which an image is read by the reading section 6 in FIG. 9 and read image data is transmitted to the image output apparatus 60.

As shown in FIG. 11, the user places the original 10 on the platen glass 112 and presses the read button, not shown, on the operating section 38 (step S111). The lamp 21 of the carriage 20 that is directly below the sub-scanning registration plate 14 as a scanning start position is turned on (step S112), a standard white board, not shown, existing at a surface portion of the platen glass 112 where the sub-scanning registration plate 14 contacts the platen glass 112 is read to generate shading data, and the image of the original 10 is read while the carriage 20 is moved in the sub-scanning direction (step S113). As shown in FIG. 3, the read image data of the read original 10 is transmitted to the image processing section 33 via the image sensor 25, the A/D converter 31, and the shading correction section 32, predetermined image processing is carried out on the image data by the image processing section 33, and the resulting image data is written onto a work memory, not shown, inside the image processing section 33.

After the image of the original 10 has been read, the lamp 21 of the carriage 20 is turned off and the carriage 20 is caused to move to the scanning start position (step S114). After removing the original 10, the user places the authentication card 80 at the predetermined position on the platen glass 112 and presses the read button, not shown, on the operating section 38 (step S115). The lamp 21 of the carriage 20 at the scanning start position is turned on and reads the ID information and the like on the authentication card 80 while moving in the sub-scanning direction (step S116). After the ID information on the authentication card 80 has been read, the lamp 21 of the carriage 20 is turned off and the carriage 20 is caused to move to the scanning start position. The read authentication card data is subjected to predetermined image processing by the image processing section 33 and then transmitted to the storage section 5. In addition, the barcode 81 is extracted by the characteristic extracting section 45 inside the storage section 5 and converted to user data by the predetermined means (step S117).

Next, the data reading section 48 reads the user registration data registered in advance inside the data storage section 49 (step S118), it is determined whether data that matches the user data converted by the characteristic extracting section 45 is present in the read user registration data (step S119), and when there is data that matches the user data, the image data stored in the work memory, not shown, inside the image processing section 33 is transmitted to the image output apparatus 60, and the present process is terminated (step S120).

When there is no data that matches the user data ("NO" to step S119), it is determined that the user is not authorized to use the image reading apparatus 1, a message informing the user to that effect is displayed on the display section 37 (step S121), the image data stored in the work memory inside the image processing section 33 is deleted (step S122), and the present process is terminated.

As described above, according to the present embodiment, since the image sensor 25 reads the image of the original 10 and also the security information of the authentication card 80 both placed on the platen glass 112, it is unnecessary to provide an extra image sensor and an extra placement section for reading the security information, and hence authentication is simplified. It is therefore possible to realize highly precise authentication and high operability while suppressing an increase in manufacturing cost.

Although in the present embodiment, the image of the original 10 is read first and the ID information or the like of the authentication card 80 is read next, it should be obvious that the same effect can be obtained when the reading order is reversed.

Also, the security information is not just ID information and the like on the authentication card 80 and authentication can be carried out for user fingerprints with the same procedure as the processes shown in FIGS. 10 and 11. In this case, since the security information is read by placing the user's fingers on the platen glass 112 that serves as the original reading area, dirt may adhere to the platen glass 112, which can affect the reading of images. For this reason, a function that reads the platen glass 112 itself to detect dirt on the platen glass 112 should preferably be implemented in predetermined timing.

The function that detects dirt on the platen glass 112 will now be described.

Figure 12:
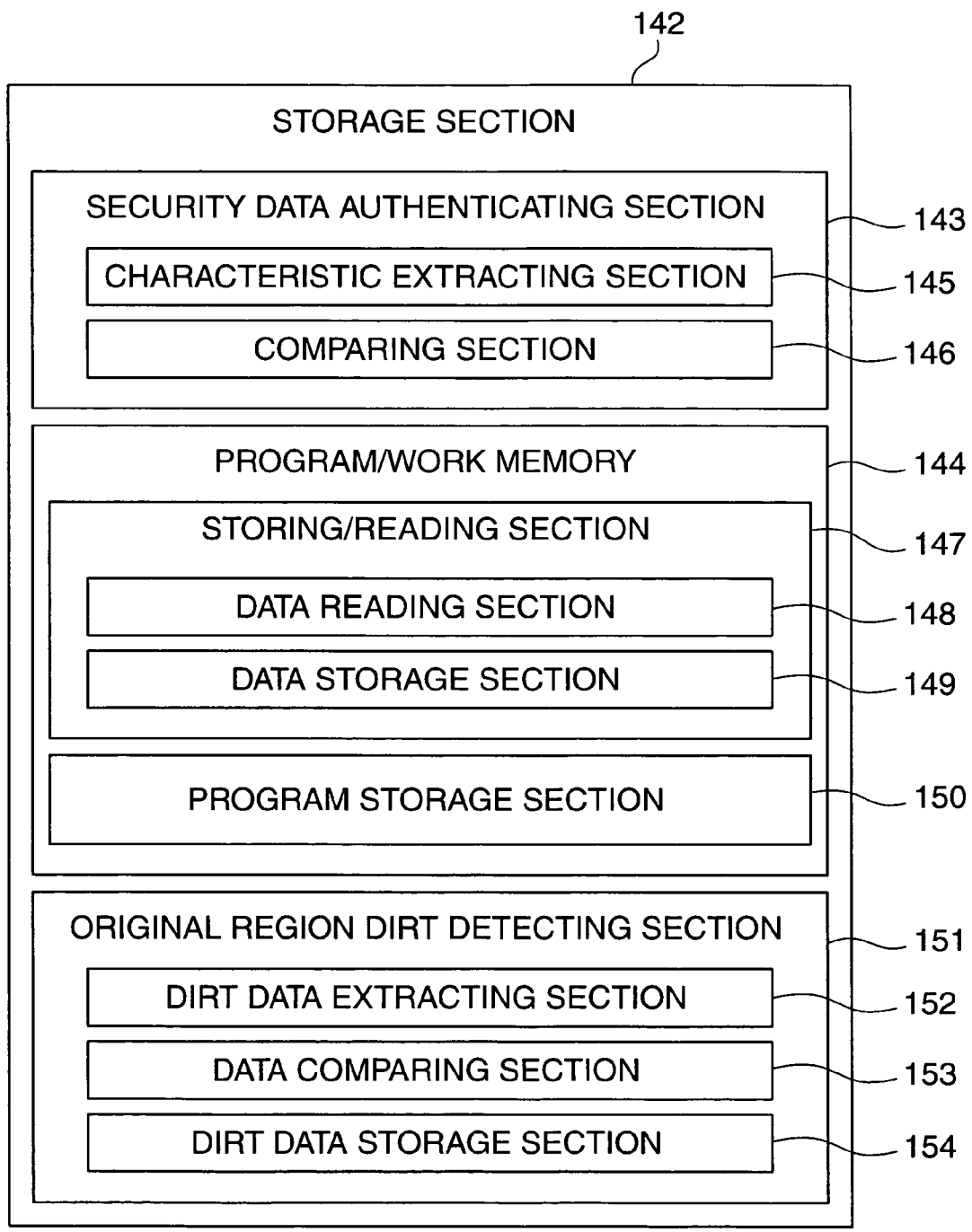
FIG. 12 is a block diagram useful in explaining a variation of the storage section in FIG. 4.

FIG. 12 is a block diagram useful in explaining a variation of the storage section 5 in FIG. 4.

As shown in FIG. 12, a storage section 142 includes a security data authenticating section 143 that authenticates security information read on the platen glass 112, a program/work memory 144, and an original region dirt detecting section 151 that detects a dirt, i.e. an extent of soiling of the platen glass surface from an image produced by reading the surface of the platen glass 112. The security data authenticating section 143 includes a characteristic extracting section 145 that extracts a characteristic of the security information, and a checking section 46 that checks the extracted characteristic. The program/work memory 144 includes a storing/reading section 147 that stores and/or reads security information, and a program storage section 150 that stores an application program executed to authenticate the security information. The storing/reading section 147 includes a data reading section 148 that reads user registration data, and a data storage section 149 that stores the read user registration data.

The original region dirt detecting section 151 includes a dirt data extracting section 152 that extracts, as dirt data, a number of pixels with a luminance above a predetermined luminance level out of the pixels in the image produced by reading the platen glass 112 in predetermined timing, a dirt data storage section 154 that stores, as initial dirt data, a number of pixels with a luminance above the predetermined luminance level out of the pixels in an image read from the platen glass 112 in an initial state, and a data comparing section 153 that reads the initial dirt data from the dirt data storage section 154 and compares the initial dirt data with the dirt data.

Figure 13:
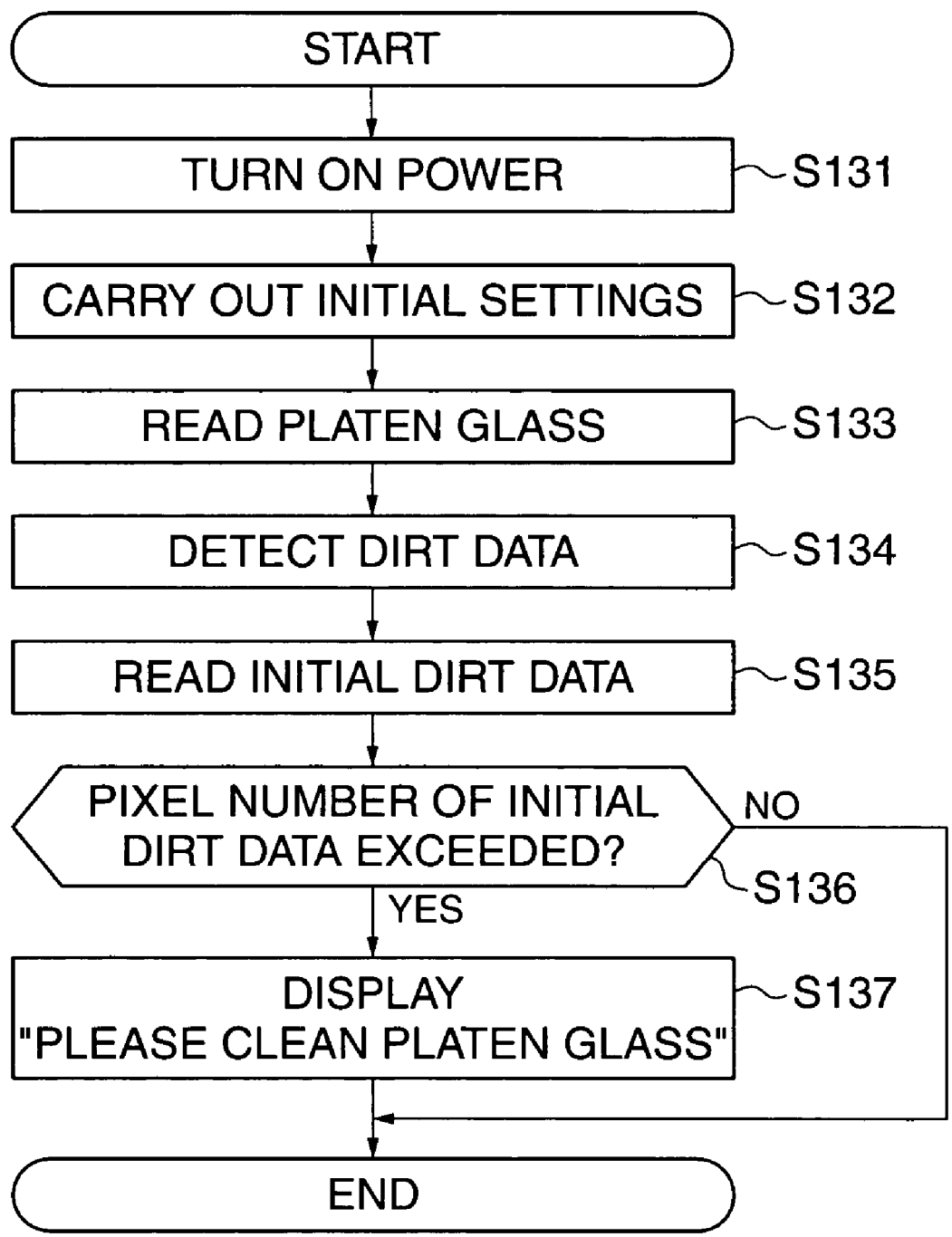
FIG. 13 is a flowchart showing the procedure of a method of detecting dirt on a platen glass.

FIG. 13 is a flowchart showing the procedure of a method of detecting dirt on the platen glass 112. Here, the case where dirt on the platen glass 112 is detected when the power of the image reading apparatus 1 is turned on will be described.

As shown in FIG. 13, when the power of the image reading apparatus 1 is turned on (step S131), initial setting processing is carried out where the carriage 20 is caused to move to a scanning start position and the lamp 21 is turned on, and the standard white board, not shown, is read to generate shading data (step S132). Next, while the lamp 21 emits light, the carriage 20 is caused to move in the sub-scanning direction to read the platen glass 112 (step S133). Out of the pixels in the read image, the number of pixels whose luminance is equal to or greater than a predetermined luminance level is extracted as the dirt data (step S134). Also, the initial dirt data stored in the dirt data storage section 154 is read (step S135) and it is determined whether the number of pixels of the dirt data extracted by the dirt data extracting section 152 exceeds that of the read initial dirt data (step S136).

When the number of pixels of the dirt data is equal to or below that of the initial dirt data, the present process is terminated. Conversely, when the number of pixels of the dirt data exceeds that of the initial dirt data, a message "PLEASE CLEAN PLATEN GLASS" is displayed on the display section 37 (step S137), and the present process is terminated.

In this way, the user can be informed that the platen glass 112 is dirty, and therefore it is possible to maintain high precision for the authentication.

It should be noted that the method of detecting dirt described above may also be applied to the first embodiment. In this case, dirt on the security information reading section 101 is detected and a message "PLEASE CLEAN SECURITY INFORMATION READING SECTION" is displayed on the display section 37. By doing so, the user can be informed that the security information reading section 101 is dirty, and therefore it is possible to maintain high precision for the authentication.

CROSS REFERENCE TO RELATED APPLICATION

This application claims priority from Japanese Patent Application No. 2004-198343 filed Jul. 5, 2004, which is hereby incorporated by reference herein.

What is claimed is:

1. An image reading apparatus comprising:
a first optically transparent placement surface on which an original is placed;
a second optically transparent placement surface on which a security information medium is placed;
an image sensor that optically reads both an image of the original placed on said first placement surface and security information stored in the security information medium placed on said second placement surface; and
a controller that controls processing of the image of the original read by said image sensor in accordance with the security information read by said image sensor;
wherein said first placement surface is physically separated from said second placement surface,
wherein said image sensor is provided as part of a reading section and the reading section includes a carriage that is reciprocally moveable in a sub-scanning direction by a motor to scan said first placement surface and said second placement surface, and
wherein the carriage includes a lamp that illuminates the original when the carriage scans said first placement surface and that illuminates the security information medium when the carriage scans said second placement surface, and a mirror that directs light reflected from the original and light reflected from the security information medium to said image sensor.

2. An image reading apparatus according to claim 1, comprising a storage device that stores security information in advance, and wherein said controller compares the security information read by said image sensor with the security information stored in said storage device and controls the processing of the image of the original read by said image sensor in accordance with a result of the comparison.

3. An image reading apparatus according to claim 2, wherein said controller is operable when the security information read by said image sensor matches the security information stored in said storage device, to transmit the image of the original read by said image sensor to an external apparatus.

4. An image reading apparatus according to claim 2, wherein said controller is operable when the security information read by said image sensor does not match the security information stored in said storage device, to delete the image of the original read by said image sensor.

5. An image reading apparatus according to claim 1, further comprising a dirt detecting device that detects dirt on said second placement surface, and a display device that displays a predetermined message in accordance with a result of the detection by said dirt detecting device.

6. An image reading apparatus according to claim 5, wherein said dirt detecting device extracts, out of an image obtained by causing said image sensor to read said second placement surface when the security information medium is not placed on the second placement surface, pixels of which luminance exceeds a predetermined luminance level, as dirt data.

7. An image reading apparatus according to claim 1, wherein the security information medium is printed matter on which information that specifies a person is printed.

8. An image reading apparatus according to claim 1, wherein the security information is personal authentication information.

9. An image reading apparatus according to claim 8, wherein the personal authentication information is a fingerprint of a user.

10. An image reading apparatus according to claim 9, wherein said second placement surface is masked so that an image can be read by said image sensor in only a fingerprint detection area.

11. An image reading apparatus according to claim 1, wherein said image sensor is a one-dimensional image sensor.

12. An image reading apparatus comprising:
an optically transparent placement surface on which an original and a security information medium are placed;
an image sensor that optically reads both an image of the original and security information stored in the security information medium that are placed on said placement surface; and
a controller that controls processing of the image of the original read by said image sensor in accordance with the security information read by said image sensor;
wherein said image sensor is provided as part of a reading section and the reading section includes a carriage that is reciprocally moveable in a sub-scanning direction by a motor to scan said placement surface, and
wherein the carriage includes a lamp that illuminates the original when the carriage scans a first portion of the placement surface and that illuminates the security information medium when the carriage scans a second portion of the placement surface, and a mirror that directs light reflected from the original and light reflected from the security information medium to said image sensor.

13. An image reading apparatus according to claim 12, comprising a storage device that stores security information in advance, and
wherein said controller compares the security information read by said image sensor with security information stored in said storage device and controls the processing of the image of the original read by said image sensor in accordance with a result of the comparison.

14. An image reading apparatus according to claim 13, wherein said controller is operable when the security information read by said image sensor matches the security information stored in said storage device, to transmit the image of the original read by said image sensor to an external apparatus.

15. An image reading apparatus according to claim 14, wherein said controller is operable when the security information read by said image sensor does not match the security information stored in said storage device, to delete the image of the original read by said image sensor.

16. An image reading apparatus according to claim 12, further comprising a dirt detecting device that detects dirt on said placement surface, and a display device that displays a predetermined message in accordance with a result of the detection by said dirt detecting device.

17. An image reading apparatus according to claim 16, wherein said dirt detecting device extracts, out of an image obtained by causing said image sensor to read placement surface when said original and said security information medium are not placed on the placement surface, pixels of which luminance exceeds a predetermined luminance level as dirt data.

18. An image reading apparatus according to claim 12, wherein said image sensor is a one-dimensional image sensor.

* * * * *